(12) United States Patent
Ueda

(10) Patent No.: US 10,703,056 B2
(45) Date of Patent: Jul. 7, 2020

(54) METHOD FOR PRODUCING TANK

(71) Applicant: TOYOTA JIDOSHA KABUSHIKI KAISHA, Toyota-shi, Aichi-ken (JP)

(72) Inventor: Naoki Ueda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 241 days.

(21) Appl. No.: 15/863,001

(22) Filed: Jan. 5, 2018

(65) Prior Publication Data
US 2018/0200968 A1    Jul. 19, 2018

(30) Foreign Application Priority Data

Jan. 16, 2017   (JP) ................................. 2017-005411

(51) Int. Cl.
*B29C 53/62* (2006.01)
*B29C 70/54* (2006.01)
(Continued)

(52) U.S. Cl.
CPC .......... *B29C 70/545* (2013.01); *B29C 53/602* (2013.01); *B29C 53/62* (2013.01); *B29C 70/32* (2013.01); *B29C 70/323* (2013.01); *B29C 70/86* (2013.01); *F17C 1/06* (2013.01); *F17C 1/16* (2013.01); *B29K 2063/00* (2013.01); *B29K 2105/103* (2013.01); *B29L 2031/7156* (2013.01); *F17C 2201/0109* (2013.01);
(Continued)

(58) Field of Classification Search
None
See application file for complete search history.

(56) References Cited

U.S. PATENT DOCUMENTS 3,148,102 A * 9/1964 Eakins ..................... D04H 3/00
                                                          156/161
3,231,442 A * 1/1966 Michael ................... F16L 9/16
                                                          156/155
(Continued)

FOREIGN PATENT DOCUMENTS

JP           63-199631 A  *  8/1988
JP        2010-264718 A     11/2010
(Continued)

*Primary Examiner* — Jeffry H Aftergut
(74) *Attorney, Agent, or Firm* — Finnegan, Henderson, Farabow, Garrett & Dunner, LLP

(57) ABSTRACT

Provided are a method for producing a tank with an outer surface profile that allows a thin label to be easily and firmly attached to a surface thereof, and also such a tank. The method for producing the tank, which includes winding fiber bundles containing an uncured resin component in multiple layers around the outer surface of a liner in a first pitch width so as to form a fiber reinforced resin layer, further includes: winding fiber bundles in a second pitch width wider than the first pitch width so as to form a gap with a required width where no fiber bundle is present between adjacent fiber bundles in winding the fiber bundles to form an outermost layer; shaving off a tip end portion of a projection made of a resin that has cured after bleeding into the gap, with a portion of the projection in a predetermined height left unshaved; and attaching a label to a surface obtained through shaving off the tip end portion.

6 Claims, 7 Drawing Sheets

(51) Int. Cl.
   *B29C 53/60*   (2006.01)
   *F17C 1/16*   (2006.01)
   *B29C 70/32*   (2006.01)
   *F17C 1/06*   (2006.01)
   *B29C 70/86*   (2006.01)
   *B29K 63/00*   (2006.01)
   *B29L 31/00*   (2006.01)
   *B29K 105/10*   (2006.01)

(52) U.S. Cl.
   CPC .. *F17C 2201/056* (2013.01); *F17C 2203/012* (2013.01); *F17C 2203/0604* (2013.01); *F17C 2203/066* (2013.01); *F17C 2203/0619* (2013.01); *F17C 2203/0631* (2013.01); *F17C 2203/0663* (2013.01); *F17C 2203/0665* (2013.01); *F17C 2203/0673* (2013.01); *F17C 2203/0682* (2013.01); *F17C 2203/0692* (2013.01); *F17C 2205/052* (2013.01); *F17C 2209/2154* (2013.01); *F17C 2209/2163* (2013.01); *F17C 2209/232* (2013.01); *F17C 2221/012* (2013.01); *F17C 2223/0123* (2013.01); *F17C 2223/036* (2013.01); *F17C 2260/011* (2013.01); *F17C 2270/0168* (2013.01); *Y02E 60/321* (2013.01)

(56) References Cited

U.S. PATENT DOCUMENTS

| | | | | |
|---|---|---|---|---|
| 3,715,252 | A | * | 2/1973 | Fairbairn ............... B29C 53/582 156/162 |
| 4,174,243 | A | * | 11/1979 | Magarian ............... B29C 53/60 118/106 |
| 4,460,422 | A | * | 7/1984 | Michael ............... B29C 53/66 118/107 |

FOREIGN PATENT DOCUMENTS

| | | |
|---|---|---|
| JP | 2011-144860 | 7/2011 |
| JP | 2013-167298 | 8/2013 |
| JP | 2013-173345 A | 9/2013 |
| JP | 2013-193393 A | 9/2013 |

* cited by examiner

METHOD FOR PRODUCING TANK

CROSS REFERENCE TO RELATED APPLICATIONS

The present application claims priority from Japanese patent application JP 2017-005411 filed on Jan. 16, 2017, the content of which is hereby incorporated by reference into this application.

BACKGROUND

Technical Field

The present disclosure relates to a method for producing a tank, in particular, a tank that is shaped such that the outer surface of a liner thereof is covered with a fiber reinforced resin layer, and relates to the tank.

Background Art

As a method for producing a high-pressure tank used for storage or supply of hydrogen or the like, there is known a method that includes winding fiber bundles containing an uncured resin component, such as CFRP, around the outer peripheral surface of a liner in a predetermined pitch width, and then curing the resin so as to form a fiber reinforced resin layer. JP 2013-167298 A describes attaching, to a cylindrical body of the high-pressure tank produced in the aforementioned manner, a thin label with relevant information, such as the producer, date of production, and fuel type, written thereon.

Further, JP 2011-144860 A describes a method for producing a high-pressure tank that has a step of winding fiber bundles containing an uncured resin component around the outer surface of a resin liner in a predetermined pitch width so as to form an uncured fiber reinforced resin layer, the method including a step of applying a solvent to an uncured surface resin layer, which has been formed through bleeding of the uncured resin component of the uncured fiber reinforced resin layer to the outside, to allow the solvent to infiltrate the uncured surface resin layer, and a step of performing heating treatment for foaming the surface resin layer to make it porous through removal of the solvent by evaporation as well as curing the resin component of the uncured fiber reinforced resin layer.

SUMMARY

FIG. 7 is a schematic partial view of a high-pressure tank produced using the method for producing a high-pressure tank described in JP 2013-167298 A or JP 2011-144860 A, the method including winding fiber bundles containing an uncured resin component around the outer surface of a liner in a predetermined pitch width so as to form an uncured fiber reinforced resin layer. In FIG. 7, reference numeral 1 indicates a liner and the outer surface of the liner 1 has formed thereon a fiber reinforced resin layer 2 of the fiber bundles wound therearound. Further, the outer surface of the fiber reinforced resin layer 2 has a surface resin layer 3 formed thereon. The surface resin layer 3 is a layer solely made of an excess resin that has bled to the outside in forming the fiber reinforced resin layer 2 through winding of the fiber bundles impregnated with the uncured resin around the liner 1.

In the actual high-pressure tank produced in the aforementioned manner, the surface of the surface resin layer 3 is not flat. This is because the surface obtained after the bleeding resin is cured is a rough surface with many projections in different sizes irregularly present thereon, since the resin bleeds from the fiber bundles randomly and irregularly both in the amount and site.

A high-pressure tank is usually required to have attached thereto a label with relevant information, such as the producer, date of production, and fuel type, written thereon, as described above. However, when the label is attached to a rough surface, the state of the attached label is unstable. Therefore, in attaching the label to the surface, it is necessary to shave off tip end portions of the aforementioned projections to obtain a substantially flat surface.

Further, the surface resin layer 3 is, in most cases, a transparent resin layer and thus has high light transmission. Therefore, it is difficult to accurately identify the shape of the rough surface and the positions of projections on the surface using laser or the like, and the actual operation of shaving off the tip end portions is manually performed while the shape is visually and tactually checked.

The work load of such operation is significant in producing the high-pressure tank. Furthermore, at the time of attachment of the label, it is necessary to apply an adhesive to the flat surface obtained through shaving off the tip end portions, and there is also a problem in that after the attachment of the label, an unnecessary item, such as a backing sheet for the label, is generated.

The present disclosure has been made in view of the foregoing circumstances, and provides a method for producing a tank, the method including winding fiber bundles containing an uncured resin component in multiple layers around the outer surface of a liner in a first pitch width so as to form an uncured fiber reinforced resin layer, which allows the tank to have an outer surface profile in which an appropriate thin label can be easily and firmly attached to the surface of the tank. The present disclosure further provides the tank with such an outer surface profile.

The method for producing a tank according to the present disclosure is a method that basically includes at least winding fiber bundles containing an uncured resin component in multiple layers around the outer surface of a liner in a first pitch width so as to form a fiber reinforced resin layer, the method including: forming one or more regions where fiber bundles are wound in a second pitch width wider than the first pitch width so as to form a gap with a required width where no fiber bundle is present between adjacent fiber bundles in winding the fiber bundles to form at least an outermost layer; and shaving off a tip end portion of a projection made of a resin that has cured after bleeding into the gap, with a portion of the projection in a predetermined height left unshaved.

According to the method for producing a tank, attachment of the thin label to the outer surface of the tank produced is easily performed and the state of the attached label is stable.

In a preferred embodiment of the method for producing a tank, the tip end portion is shaved off so that the portion left unshaved has a flat surface. Further, in another preferred embodiment, the method for producing a tank further includes forming a light reflecting layer through application of a material for forming the light reflecting layer on at least a surface of the projection and determining the position and shape of the projection through irradiating the light reflecting layer with laser, in which the tip end portion is shaved off based on the information obtained from the determination. In yet another preferred embodiment of the method for producing a tank, a material containing an adhesive is used as the material for forming the light reflecting layer.

In a preferred embodiment, the method for producing a tank further includes attaching a thin label to the surface obtained through shaving off the tip end portions. Further, in another preferred embodiment of the method for producing a tank, the one or more regions where the fiber bundles are wound in the second pitch width is/are present in at least a cylindrical body of the tank.

The tank according to the present disclosure is a tank that has a fiber reinforced resin layer formed through winding fiber bundles containing an uncured resin component in multiple layers around the outer surface of a liner, in which at least the outermost layer of the fiber reinforced resin layer has one or more regions where a gap where no fiber bundle is present between adjacent fiber bundles is formed, the resin that has cured after bleeding is present in the gap, and the top surface of the resin that has cured is a flat surface.

In a preferred embodiment of the tank, an adhesive is applied to the flat surface thereof. Further, in another preferred embodiment of the tank, the one or more regions where the gap is formed is/are present in at least the cylindrical body of the tank. In yet another preferred embodiment of the tank, a thin label is attached to the aforementioned flat surface.

According to the present disclosure, it is possible to obtain a tank that has a fiber reinforced resin layer on the outer surface of a liner thereof, in which a thin label can be easily and surely attached to the surface of the tank.

DETAILED DESCRIPTION

An embodiment of the present disclosure will be described below with reference to the drawings.

Figure 1:
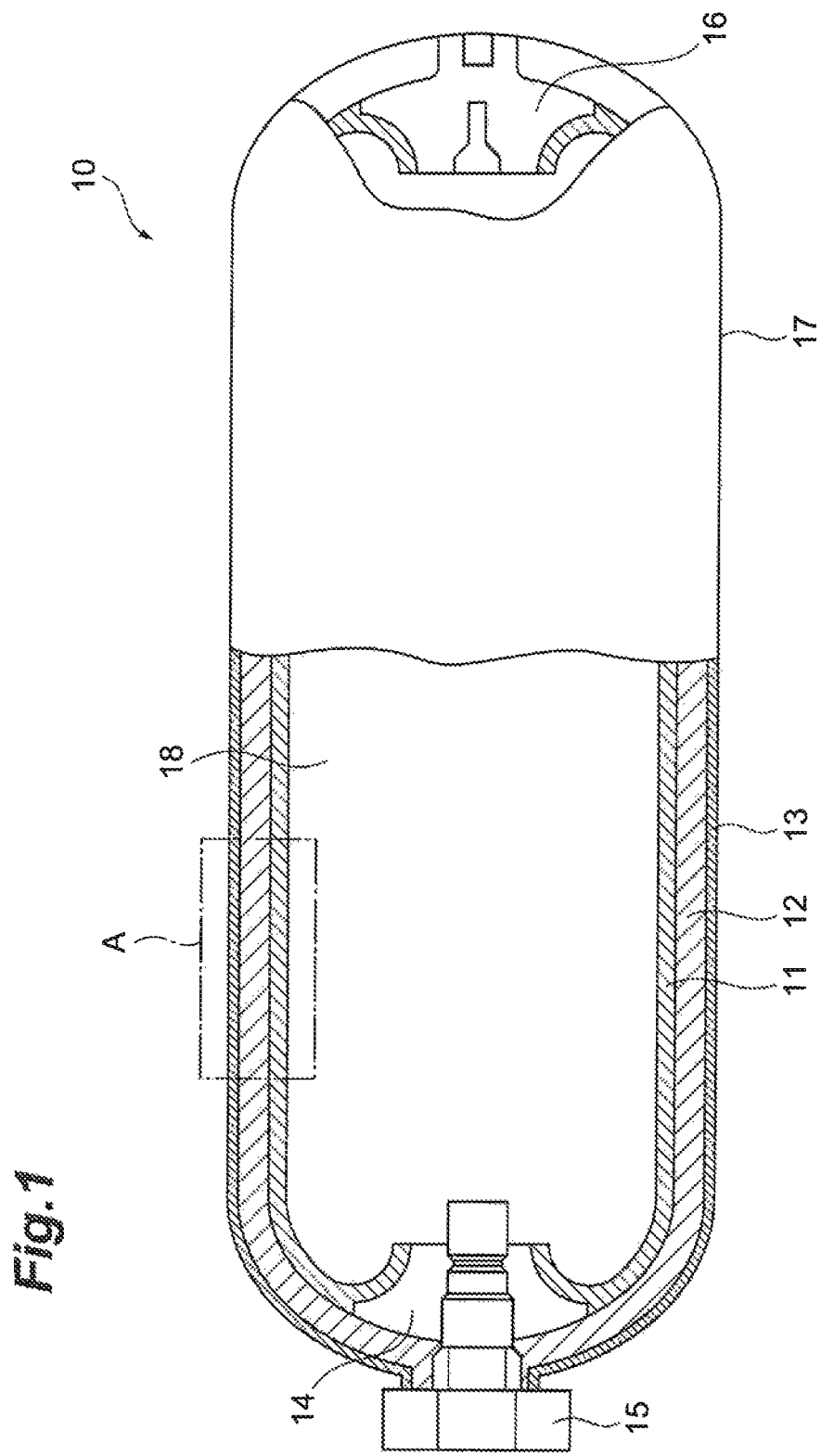
FIG. 1 is a view of an example of a high-pressure tank.

FIG. 1 is a schematic view of an example of a tank. In this example, a tank 10 is a high-pressure tank that is adapted to be filled with a high-pressure hydrogen gas and mounted on a fuel cell vehicle. However, the tank 10 may be used for any purposes, and the filling is not limited to a high-pressure hydrogen gas.

In this example, the high-pressure tank 10 includes a cylindrical body 17 with opposite ends in a round dome shape, a gas barrier liner 11, and a fiber reinforced resin layer 12 including a surface resin layer 13. Further, the high-pressure tank 10 has openings formed at the opposite ends thereof, and one of the openings has attached thereto a mouthpiece 14 with a valve 15, and the other has attached thereto an end boss 16. The cylindrical body 17 forms the center portion of the high-pressure tank 10.

The liner 11 is a resin member that defines an accommodation space 18 to be filled with, for example, a high-pressure hydrogen gas. Typically, the liner 11 is made of a thermoplastic resin that can be processed into a substantially cylindrical shape or the like. The resin that forms the liner 11 is preferably a resin that can be easily processed and has a property of retaining a hydrogen gas within the accommodation space 18, that is, a resin that is excellent in the gas barrier property. Examples of such a resin include a thermoplastic resin, such as polyester, polyamide, polyethylene, and ethylene vinyl alcohol copolymer (EVOH).

The liner 11 is in a substantially cylindrical shape with the dome portions at the opposite ends of the cylindrical body 17 as described above. Each of the dome portions of the liner 11 has an opening formed therein as described above, and the openings in the dome portions at the opposite ends are provided with the mouthpiece 14 and the end boss 16, respectively. The fiber reinforced resin layer 12 is formed along the outer surface of the liner 11.

The fiber reinforced resin layer 12 is a layer that covers the outer surface of the liner 11 and has a function of reinforcing the liner 11 to improve the mechanical strength of the high-pressure tank 10, such as the rigidity and pressure resistance. The fiber reinforced resin layer 12 includes a thermosetting resin and reinforced fiber bundles. As the thermosetting resin, it is preferable to use a phenol resin, melamine resin, urea resin, epoxy resin, and the like, of which the epoxy resin is, in particular, preferably used from the viewpoint of the mechanical strength and the like. As the reinforced fibers, glass fibers, aramid fibers, boron fibers, carbon fibers, and the like can he used, and the carbon fibers are, in particular, preferably used from the viewpoint of the lightness, mechanical strength, and the like.

Typically, an epoxy resin is obtained through mixing and thermally curing a prepolymer, such as a copolymer of bisphenol A and epichlorohydrin, and a curing agent, such as polyamine. The epoxy resin is fluid in an uncured state, but after thermally cured, the epoxy resin forms a strong cross-linked structure so as to become insoluble in a solvent, such as methyl ethyl ketone (MEK).

The fiber reinforced resin layer 12 is formed such that bundles of fibers (for example, carbon fibers) impregnated with an uncured resin (for example, an epoxy resin) are wound around the outer surface of the liner 11 in multiple layers in a given pitch width (hereinafter referred to as a first pitch width a), and the resin is then cured. For example, a shaft is attached to the mouthpiece 14 and end boss 16 of the liner 11 and is rotatably supported, and fiber bundles impregnated with resin are wound while the shaft is being rotated. Then, heating is performed at the curing temperature of the resin to cure the resin component. Helical winding or hoop winding is adopted for winding of the fiber bundles. The first pitch width a is typically set to a value almost equal to the width of each of the fiber bundles to be used.

Figure 2:
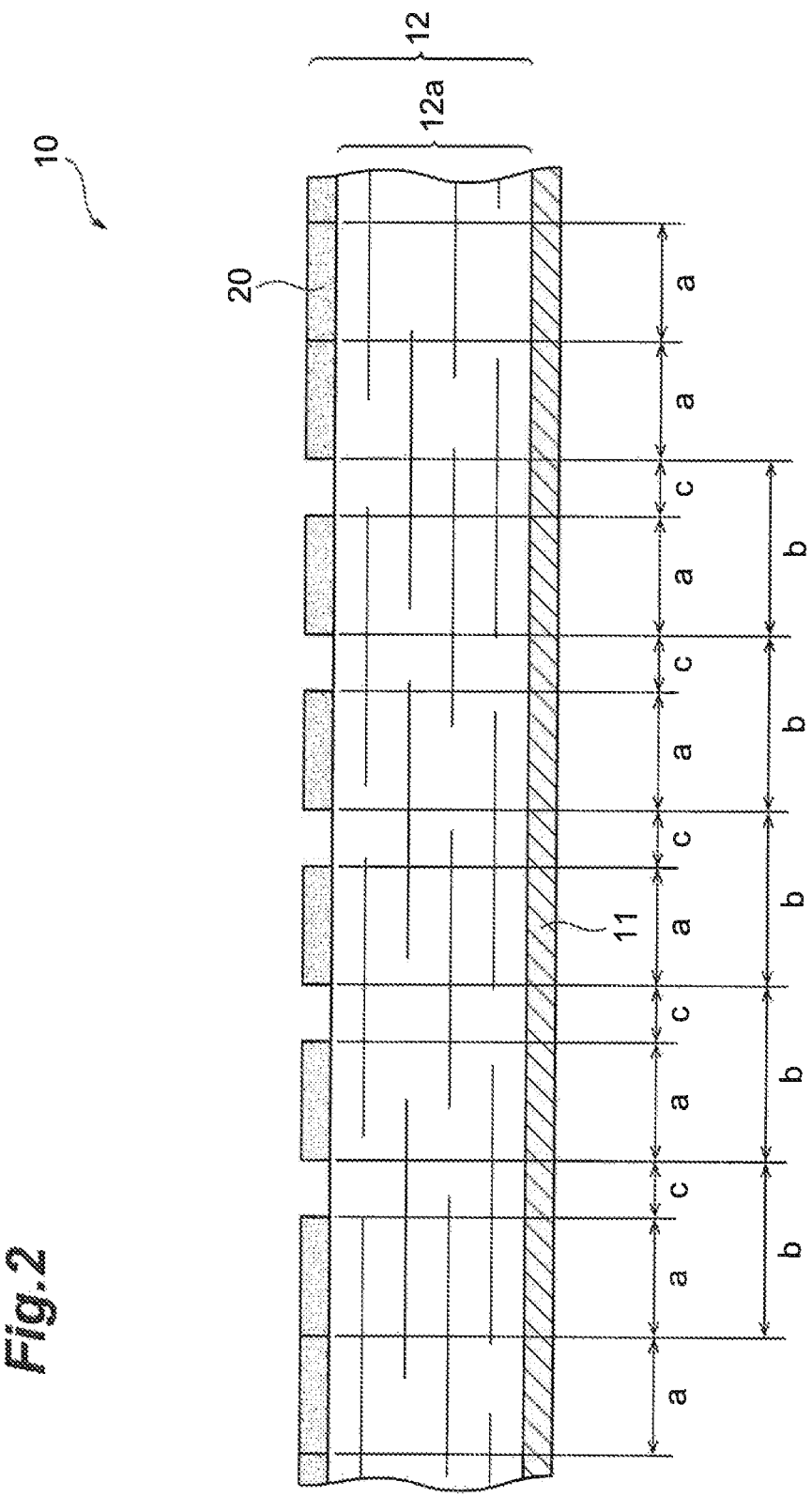
FIG. 2 is a first view for illustration of an operation procedure of an embodiment.

In winding the fiber bundles impregnated with resin in multiple layers, as shown in FIG. 2, when the fiber bundles are wound to form at least an outermost layer 20 of the fiber reinforced resin layer 12, the fiber bundles are wound around some regions in a second pitch width b wider than the first pitch width a. The region where the fiber bundles are wound in the second pitch width b may be any region, but is preferably the cylindrical body 17 of the high-pressure tank 10.

FIG. 2 to FIG. 6 are schematic enlarged views of a region indicated by A in FIG. 1 of the high-pressure tank 10 of the present embodiment. In this example, a portion 12a other than the uppermost layer 20 of the fiber reinforced resin layer 12 is entirely wound with the fiber bundles impregnated with an uncured resin in multiple layers in the first pitch width a, for example. Herein, the first pitch width a is almost equal to the width of each of the fiber bundles.

In winding the fiber bundles to form the uppermost fiber bundle layer 20, the fiber bundles impregnated with resin are wound in the second pitch width b wider than the first pitch width a in a region where a label is to be attached after completion of the high-pressure tank. In an example shown in FIG. 2, the second pitch width b is "the first pitch width a plus the width c of the gap." As an example, the first pitch width a and the second pitch width b are typically around 12 to 20 mm and around 20 to 24 mm, respectively.

Through winding the fiber bundles to form the uppermost fiber bundle layer 20 in the aforementioned manner, in the uppermost layer 20, a portion where the fiber bundles are wound in the first pitch width a has the fiber bundles arranged in rows substantially with no gap between the fiber bundles, while in a region where the fiber bundles are wound in the second pitch width b, as shown in FIG. 2, a gap with the width c with no fiber bundle present therein is formed between adjacent fiber bundles. In the experiment conducted by the present inventors, an intended purpose was able to be achieved when the width c of the gap was set to around 0.25 to 0.5 times the width of the fiber bundle as 1.

It should be noted that in the example shown in the drawings, winding of the fiber bundles in the second pitch width b is performed only in the uppermost fiber bundle layer 20, but also in some of the layers below the uppermost layer, the fiber bundles may be wound in the second pitch width b in some portions. However, in that case, the layers are preferably formed through winding the fiber bundles so that the gaps with the width c where no fiber bundle is present in the layers are radially aligned relative to the central axis of the tank.

In the fiber reinforced resin layer 12 that is formed through winding the fiber bundles impregnated with an uncured resin (for example, an epoxy resin) in multiple layers, the surface resin layer 13 is formed through bleeding of the uncured resin to the outside as shown in FIG. 1. As described above, typically, the surface of the surface resin layer 13 is not flat, and is a rough surface with many projections in different sizes irregularly present thereon, because the resin bleeds from the fiber bundles randomly and irregularly both in the amount and site. It should be noted that in. FIG. 2 to FIG. 6, the surface resin layer 13 is not shown for easy understanding.

Figure 3:
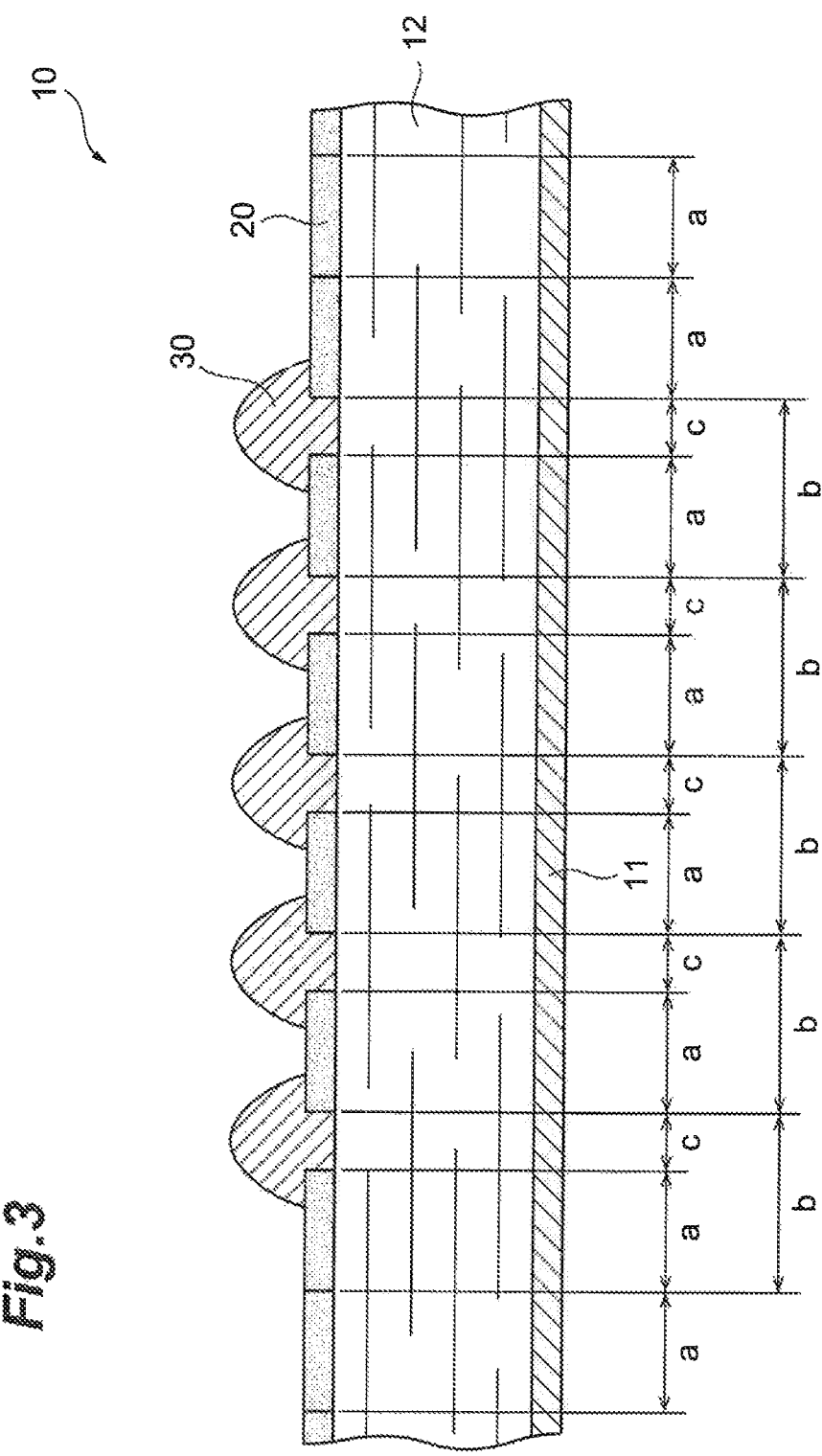
FIG. 3 is a second view for illustration of an operation procedure of the embodiment.

In the high-pressure tank 10 of the aforementioned embodiment, as described above and shown in FIG. 2, the uppermost layer 20 of the fiber reinforced resin layer 12 has a gap with the width c where no fiber bundle is present between adjacent fiber bundles in some portions thereof. Therefore, the uncured resin that has impregnated the fiber bundles bleeds more into each of the gaps with the width c that has no fiber bundle present therein and has less resistance as compared to other regions. Then, the bleeding resin projects in a chevron shape from the gaps with the width c radially relative to the central axis of the tank so that projections 30 are formed, as shown in FIG. 3. It should be noted that through appropriately adjusting the amount of resin that impregnates the fiber bundles and the width c of the gap, that is, the second pitch width b, the height of each of the projections 30 that are formed through curing of the bleeding resin can be appropriately adjusted. The optimum values may be experimentally determined.

With the aforementioned state, the resin is cured. However, each of the projections 30 made of the cured resin has a round top portion and thus is not suitable for attaching a thin label thereto. Therefore, the tip end portion of each of the projections 30 is shaved off by means of an appropriate means with a portion thereof in a predetermined height left unshaved. More preferably, each of the tip end portions is shaved off so as to obtain a flat surface. It should be noted that, as described above, each of the projections 30 of the bleeding resin is made of a transparent thermosetting resin and has high light transmission. Therefore, it is extremely difficult to perform mechanical processing of shaving off the tip end portions of the projections 30 based on the information obtained through reading the shapes of the projections using laser irradiation.

Therefore, in the present embodiment, a step of applying of a material for forming a light reflecting layer to the region where the fiber bundles are wound in the second pitch width b so as to form a light reflecting layer 40 is further performed. It is preferable, from the viewpoint of operability, to apply the material to the entire region where the fiber bundles are wound in the second pitch width b, but applying the material only to at least the surface portions of the projections 30 can also achieve an intended purpose.

Figure 4:
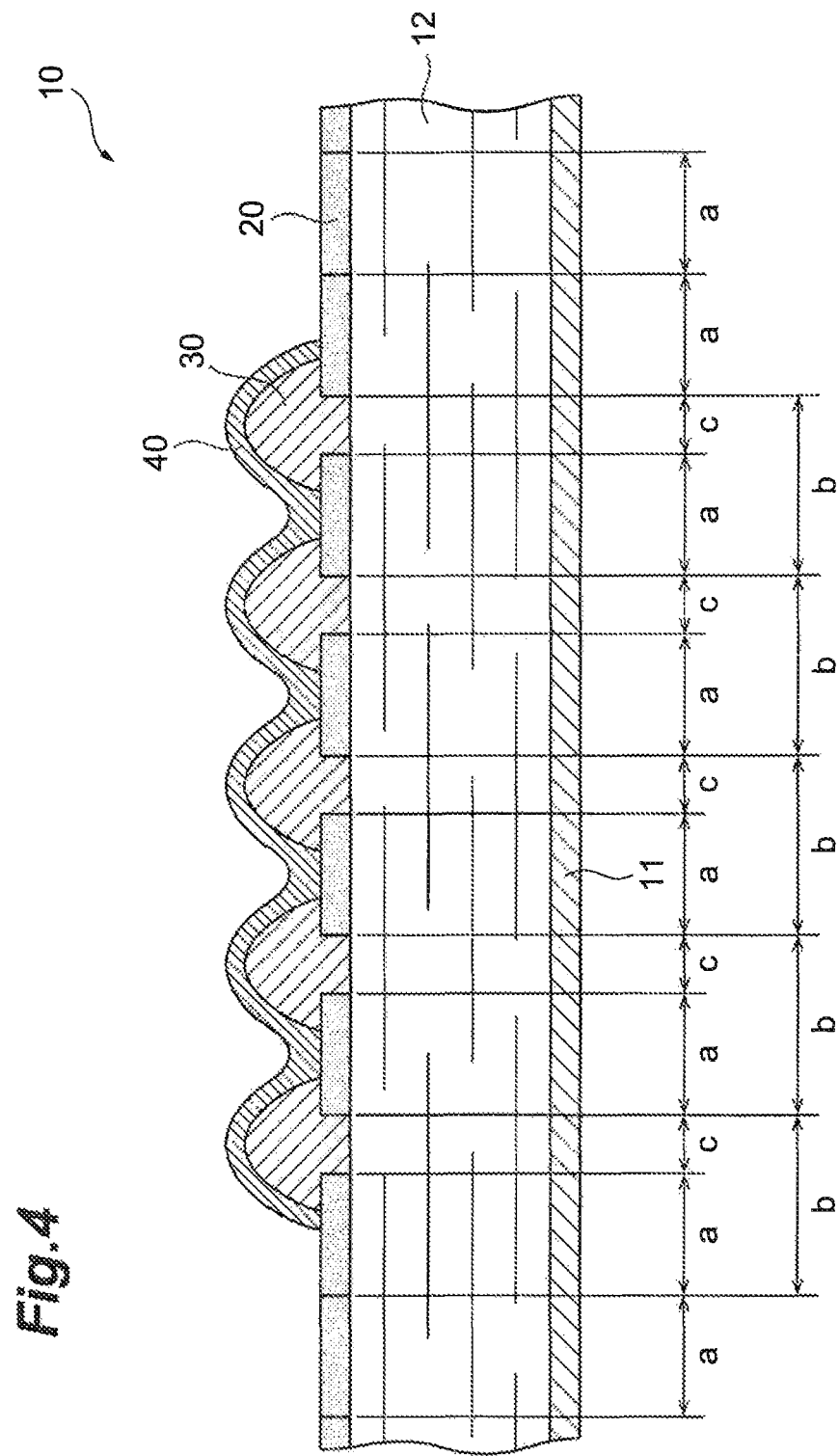
FIG. 4 is a third view for illustration of an operation procedure of the embodiment.

Examples of the "material for forming a light reflecting layer" include materials containing metal powder, of which a titanium oxide is particularly preferred. FIG. 4 shows the state of the light reflecting layer 40 that has been formed through application of the material for forming the light reflecting layer. With the thickness of the light reflecting layer 40 of around 20 µm, for example, an intended purpose can be sufficiently achieved.

Figure 5:
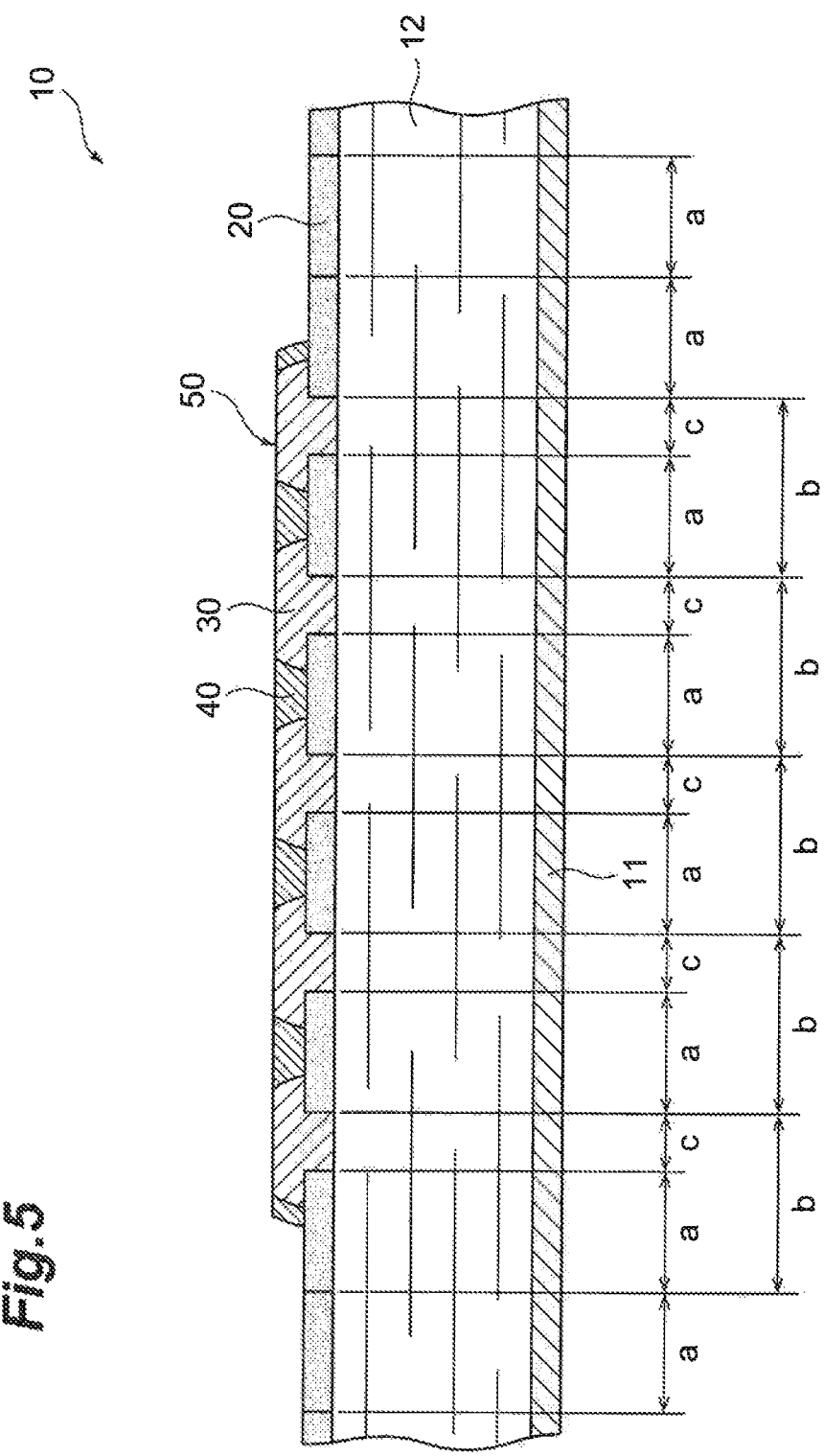
FIG. 5 is a fourth view for illustration of an operation procedure of the embodiment.
Figure 6:
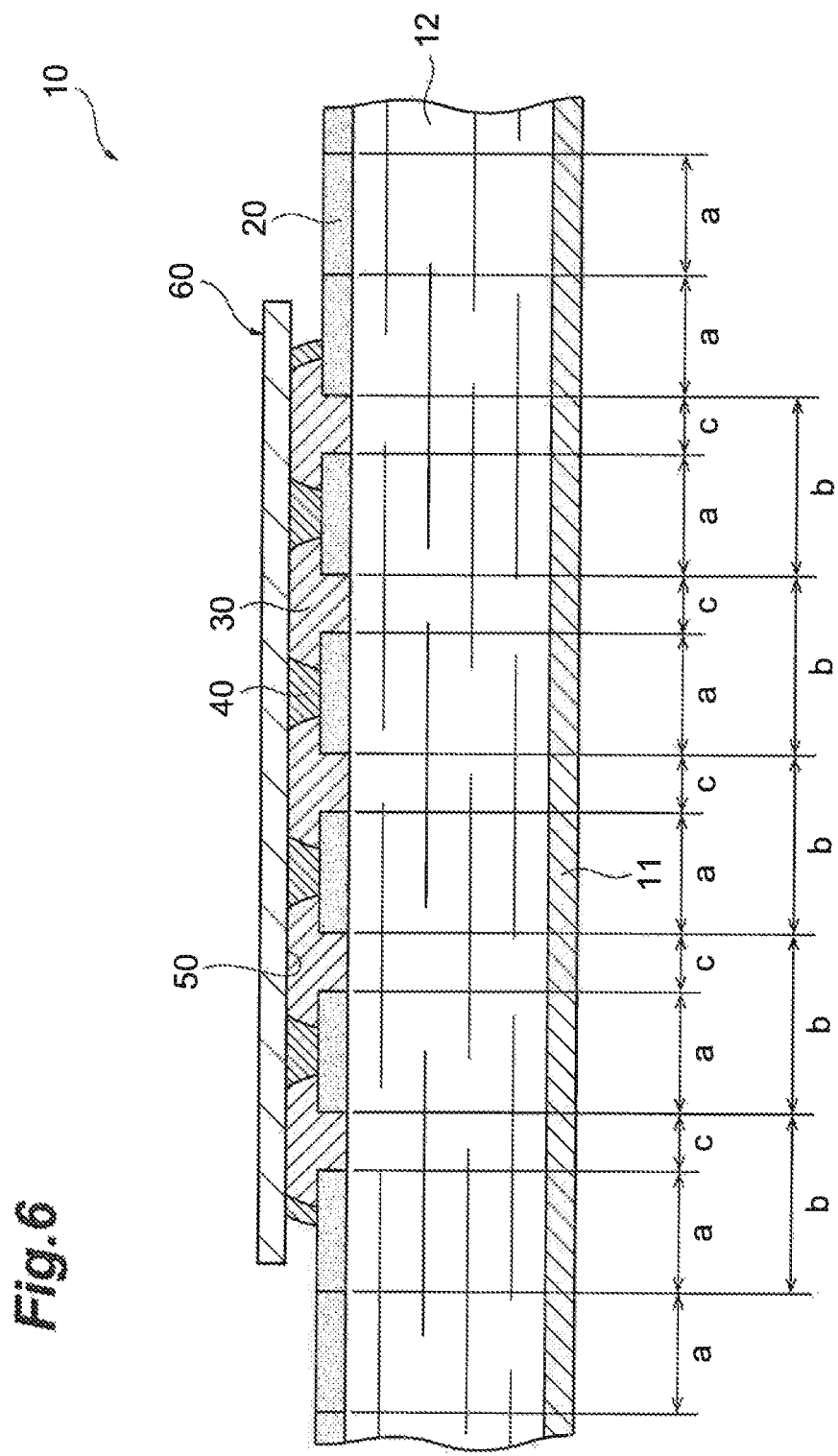
FIG. 6 is a fifth view for illustration of an operation procedure of the embodiment.
Figure 7:
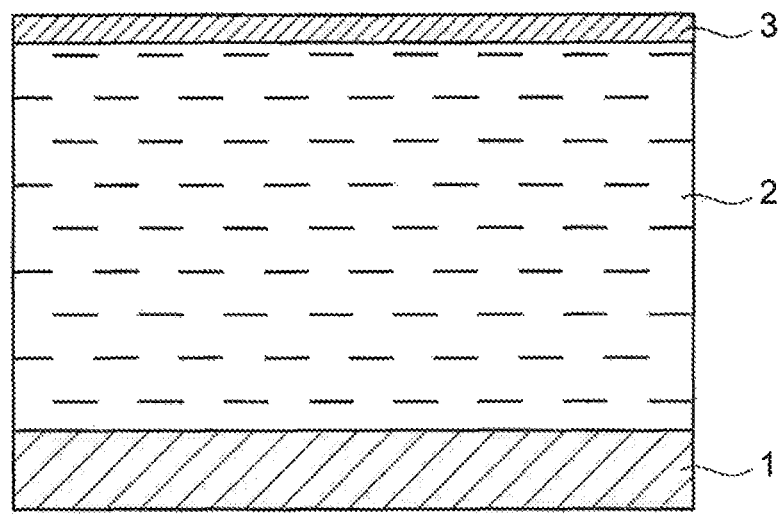
FIG. 7 is a partial view for illustration of the structure of a conventional high-pressure tank.

With the light reflecting layer 40 formed, the shapes and positions of the projections 30 can be determined using laser, and the tip end portions of the projections 30 can be mechanically shaved off so as to obtain an appropriate shape based on the obtained information. FIG. 5 shows the state after the tip end portions are shaved off. In this example, through mechanically shaving off the tip end portions, the surface of the portion left unshaved becomes a flat shaved surface 50. Through obtainment of the flat shaved surface 50, as shown in FIG. 6, it becomes possible to easily attach a thin label 60 to the surface.

As the label 60 to be attached, a label provided with an adhesive or cohesive layer on the backside thereof may be used. Further, it is also possible to attach a label with no adhesive layer on the backside thereof after application of an adhesive to the shaved surface 50. In both cases, since the shaved surface 50 is flat, the operation of applying an adhesive to the shaved surface 50 is easily performed, and attachment of the label 60 after the application of the adhesive is also facilitated. Further, since the interface for the attachment is a flat surface, a stable attachment state can be obtained.

In an aspect of the aforementioned embodiment, a material mixed with an adhesive is used as the material for forming the light reflecting layer 40. Examples of the adhesive to be mixed may include materials, such as an epoxy resin, modified silicone, urethane resin, acrylic resin, and cyanoacrylate, of which the epoxy resin is particularly suitable. With the use of the material mixed with the adhesive, it is unnecessary to additionally use the adhesive at the time of attachment of the label 60, so that the attachment of the label is more easily and surely performed.

As described above, according to the present embodiment, in the method for producing the high-pressure tank 10 that has the fiber reinforced resin layer 12 on the outer surface of the liner 11 thereof, it is possible to produce the high-pressure tank 10 that allows the thin label 60 to be easily and surely attached to the surface of the tank. Further, it is possible to obtain the high-pressure tank 10 in which the label is stably attached to the regions where the fiber bundles are wound in the second pitch width b of the produced high-pressure tank 10.

In another embodiment, in addition to the aforementioned processing, the processing described in JP 2011-144860 A may be further performed that includes a step of applying a solvent to the uncured surface resin layer 13, which has been formed through bleeding of an uncured resin component of the uncured fiber reinforced resin layer to the outside, to allow the solvent to infiltrate the uncured surface resin layer 13, and a step of performing heating treatment for foaming the surface resin layer 13 to make it porous through removal of the solvent by evaporation as well as curing the resin component of the uncured fiber reinforced resin layer. A method for producing a tank that further includes the aforementioned method and a tank produced using the method are also encompassed by the present disclosure.

In that case, it is preferable to use as the solvent a solvent that is highly compatible with an uncured resin and that has a tower boiling point than the heating temperature at the time of performing thermal curing. When an epoxy resin is used as the resin for forming the fiber reinforced resin layer 12 (surface foamed resin layer 13), methyl ethyl ketone (MEK), toluene, dimethylacetamide, acetone, and the like may be used, and in particular, it is preferable to use MEK. Further, the compatibility and evaporation temperature may be adjusted through mixing of two or more solvents.

DESCRIPTION OF SYMBOLS

10 High-pressure tank
11 Liner
12 Fiber reinforced resin layer
18 Accommodation space
20 Uppermost layer of fiber reinforced resin layer
30 Projection of cured resin
40 Light reflecting layer made of material for forming light reflecting layer
50 Flat shaved surface
60 Attached thin label
a First winding pitch width of fiber bundles
b Second winding pitch width of fiber bundles
c Difference between second winding pitch width and first winding pitch width (gap between fiber bundles)

What is claimed is:

1. A method for producing a tank, including at least winding fiber bundles containing an uncured resin component in multiple layers around an outer surface of a liner in a first pitch width so as to form a fiber reinforced resin layer, the method comprising:
    forming one or more regions where fiber bundles are wound in a second pitch width wider than the first pitch width so as to form a gap with a required width where no fiber bundle is present between adjacent fiber bundles in winding the fiber bundles to form at least an outermost layer; and
    shaving off a tip end portion of a projection made of a resin that has cured after bleeding into the gap, with a portion of the projection in a predetermined height left unshaved.

2. The method for producing a tank according to claim 1, wherein the tip end portion is shaved off so that the portion left unshaved has a flat surface.

3. The method for producing a tank according to claim 1, further comprising:
    forming a light reflecting layer through application of a material for forming the light reflecting layer on at least a surface of the projection; and
    determining a position and shape of the projection through irradiating the light reflecting layer with laser, wherein the tip end portion is shaved off based on information obtained from the determination.

4. The method for producing a tank according to claim 3, wherein a material containing an adhesive is used as the material for forming the light reflecting layer.

5. The method for producing a tank according to claim 1, further comprising attaching a thin label to the surface obtained through shaving off the tip end portion.

6. The method for producing a tank according to claim 1, wherein the one or more regions where the fiber bundles are wound in the second pitch width is/are present in at least a cylindrical body of the tank.

\* \* \* \* \*